(12) United States Patent
Heinrichs et al.

(10) Patent No.: US 12,258,072 B2
(45) Date of Patent: Mar. 25, 2025

(54) VEHICLE HOOD APPARATUS AND METHOD

(71) Applicant: Honda Motor Co., Ltd., Tokyo (JP)

(72) Inventors: Steven C. Heinrichs, Raymond, OH (US); Stephen D. Rosenkrantz, Raymond, OH (US); Patrick J. Ellison, Raymond, OH (US); Taiga Marukawa, Raymond, OH (US); Kosaku Tomozawa, Raymond, OH (US); Akira Futatsuhashi, Raymond, OH (US); Gilberto Larrache-Irizarry, Raymond, OH (US); Steve Faria, Raymond, OH (US); Keiichiro Tsuji, Raymond, OH (US); Takashi Nakano, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 670 days.

(21) Appl. No.: 17/689,531

(22) Filed: Mar. 8, 2022

(65) Prior Publication Data

US 2023/0303185 A1 Sep. 28, 2023

(51) Int. Cl.
*B62D 25/10* (2006.01)
*B62D 25/12* (2006.01)
(Continued)

(52) U.S. Cl.
CPC ............. *B62D 25/12* (2013.01); *B62D 25/10* (2013.01); *E05D 11/10* (2013.01); *E05D 3/145* (2013.01)

(58) Field of Classification Search
CPC ...... B62D 25/10; B62D 25/105; B62D 25/12; B60J 5/106; E05D 3/145; E05D 11/10;
(Continued)

(56) References Cited

U.S. PATENT DOCUMENTS 3,051,523 A * 8/1962 Boyce-Smith .......... E05D 3/145
296/100.1
5,101,921 A 4/1992 West et al.
(Continued)

FOREIGN PATENT DOCUMENTS

CN 210049735 U 2/2020
JP H0811750 A 1/1996
(Continued)

*Primary Examiner* — Gregory A Blankenship
(74) *Attorney, Agent, or Firm* — KENEALY VAIDYA LLP

(57) ABSTRACT

A vehicle hood assembly can include a vehicle body structure and a hood moveable with respect to the vehicle body structure from a closed state to an opened state. A first linkage can connect the hood to the vehicle body structure and include a first linkage aperture extending therethrough. A second linkage can connect the hood to the vehicle body structure and include a second linkage aperture extending therethrough. A central axis of the first linkage aperture can be coaxial with a central axis of the second linkage aperture if the hood is in the opened state. A key structure can be provided and configured to simultaneously fit into both the second linkage aperture and the first linkage aperture if the hood is in the opened state.

20 Claims, 13 Drawing Sheets

(51) Int. Cl.
*E05D 3/14* (2006.01)
*E05D 11/10* (2006.01)

(58) Field of Classification Search
CPC ............ E05D 11/1007; E05D 11/1014; E05D 11/1028; E05D 11/1085; E05Y 2900/536
See application file for complete search history.

(56) References Cited

U.S. PATENT DOCUMENTS

| | | | |
|---|---|---|---|
| 5,339,494 A | 8/1994 | Esau et al. | |
| 6,330,734 B1 | 12/2001 | Cho | |
| 6,554,093 B2 | 4/2003 | Sasaki et al. | |
| 7,207,406 B1 | 4/2007 | Polz et al. | |
| 7,506,716 B1 | 3/2009 | Salmon et al. | |
| 7,854,289 B2 | 12/2010 | Gust | |
| 9,156,503 B2 | 10/2015 | Kwon | |
| 9,701,275 B2 | 7/2017 | Kim et al. | |
| 10,100,565 B2 | 10/2018 | Waskie et al. | |
| 10,315,612 B2 | 6/2019 | Yamada | |
| 2001/0005920 A1* | 7/2001 | Kim | E05D 5/062 16/334 |
| 2007/0035155 A1* | 2/2007 | Ishimaru | E02F 9/0891 296/136.01 |
| 2009/0289473 A1* | 11/2009 | Kmieciak | B60R 21/38 296/193.11 |
| 2010/0024162 A1 | 2/2010 | Waltz | |
| 2010/0096202 A1* | 4/2010 | Bonsen | E05C 17/16 180/69.21 |
| 2017/0275931 A1* | 9/2017 | Iacovoni | E05B 85/00 |
| 2022/0235592 A1* | 7/2022 | Gutierrez-Fernandez | E05D 11/1014 |
| 2022/0307311 A1* | 9/2022 | Nilsson | E05D 11/1007 |
| 2022/0372805 A1* | 11/2022 | Randolph | E05D 3/16 |
| 2023/0303185 A1* | 9/2023 | Heinrichs | B62D 25/12 |
| 2024/0010161 A1* | 1/2024 | Kim | B60R 21/38 |

FOREIGN PATENT DOCUMENTS

| | | |
|---|---|---|
| JP | 3465520 B2 | 11/2003 |
| JP | 4163272 B2 | 10/2008 |
| KR | 100306584 B1 | 11/2001 |
| KR | 100774772 B1 | 11/2007 |

\* cited by examiner

VEHICLE HOOD APPARATUS AND METHOD

BACKGROUND

The disclosed subject matter relates to a vehicle hood apparatus and method that includes hinge linkage members connecting a vehicle hood to a vehicle body structure. More particularly, the disclosed subject matter relates to methods and apparatus that permits a vehicle hood to stay in an opened state by the use of a key structure that fits within apertures in specific geometrically configured linkages of a hood hinge.

SUMMARY

Some embodiments are directed to a vehicle hood assembly that can include a vehicle body structure, and a hood moveable with respect to the vehicle body structure from a closed state to an opened state. A first linkage can connect the hood to the vehicle body structure and be configured to move within a first plane. The first linkage can include a first linkage aperture extending through the first linkage in a direction substantially perpendicular to the first plane. A second linkage can connect the hood to the vehicle body structure and be configured to move within a second plane. The second linkage can include a second linkage aperture extending through the second linkage in a direction substantially perpendicular to the second plane, and the second plane can be substantially parallel to the first plane. The second linkage and first linkage can be configured such that a central axis of the first linkage aperture is coaxial with a central axis of the second linkage aperture if the hood is in the opened state, and such that the central axis of the first linkage aperture is spaced from the central axis of the second linkage aperture if the hood is moved from opened state. A key structure can be configured to simultaneously fit into both the second linkage aperture and the first linkage aperture if the hood is in the opened state.

Some embodiments are directed to a vehicle hood assembly that includes a vehicle body structure and a hood moveable with respect to the vehicle body structure from a closed state to an opened state. A first U-shaped linkage can connect the hood to the vehicle body structure, and can include a first U-shaped linkage aperture extending through the first U-shaped linkage. A second U-shaped linkage can connect the hood to the vehicle body structure, and the second U-shaped linkage can include a second U-shaped linkage aperture extending through the second linkage. The second U-shaped linkage and first U-shaped linkage can be configured such that a central axis of the first U-shaped linkage aperture is coaxial with a central axis of the second U-shaped linkage aperture if the hood is in the opened state, and such that the central axis of the first U-shaped linkage aperture is spaced from the central axis of the second U-shaped linkage aperture if the hood is moved from opened state. A key structure can be configured to simultaneously fit into both the second U-shaped linkage aperture and the first U-shaped linkage aperture if the hood is in the opened state.

Some embodiments are directed to a vehicle hood assembly that can include a vehicle body structure and a hood configured for placement over at least one of, an engine compartment, and a storage compartment, and moveable with respect to the vehicle body structure from a closed state to an opened state. A first linkage can connect the hood to the vehicle body structure and include a first pivot structure about which the first linkage is rotatable and a second pivot structure about which the first linkage is rotatable. The first linkage can include a first linkage aperture extending through the first linkage and located between the first pivot structure and second pivot structure, wherein the first pivot structure, second pivot structure and first linkage aperture are located within a first plane. A second linkage can connect the hood to the vehicle body structure and include an initial pivot structure about which the second linkage is rotatable and a secondary pivot structure about which the second linkage is rotatable. The second linkage can include a second linkage aperture extending through the second linkage and located between the initial pivot structure and secondary pivot structure, wherein the initial pivot structure, secondary pivot structure and second linkage aperture are located within a second plane that is substantially parallel with the first plane. The second linkage and the first linkage can be configured such that a central axis of the first linkage aperture is coaxial with a central axis of the second linkage aperture if the hood is in the opened state, and such that the central axis of the first linkage aperture is spaced from the central axis of the second linkage aperture if the hood is moved from opened state. A key structure can be configured to simultaneously fit into both the second linkage aperture and the first linkage aperture if the hood is in the opened state.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
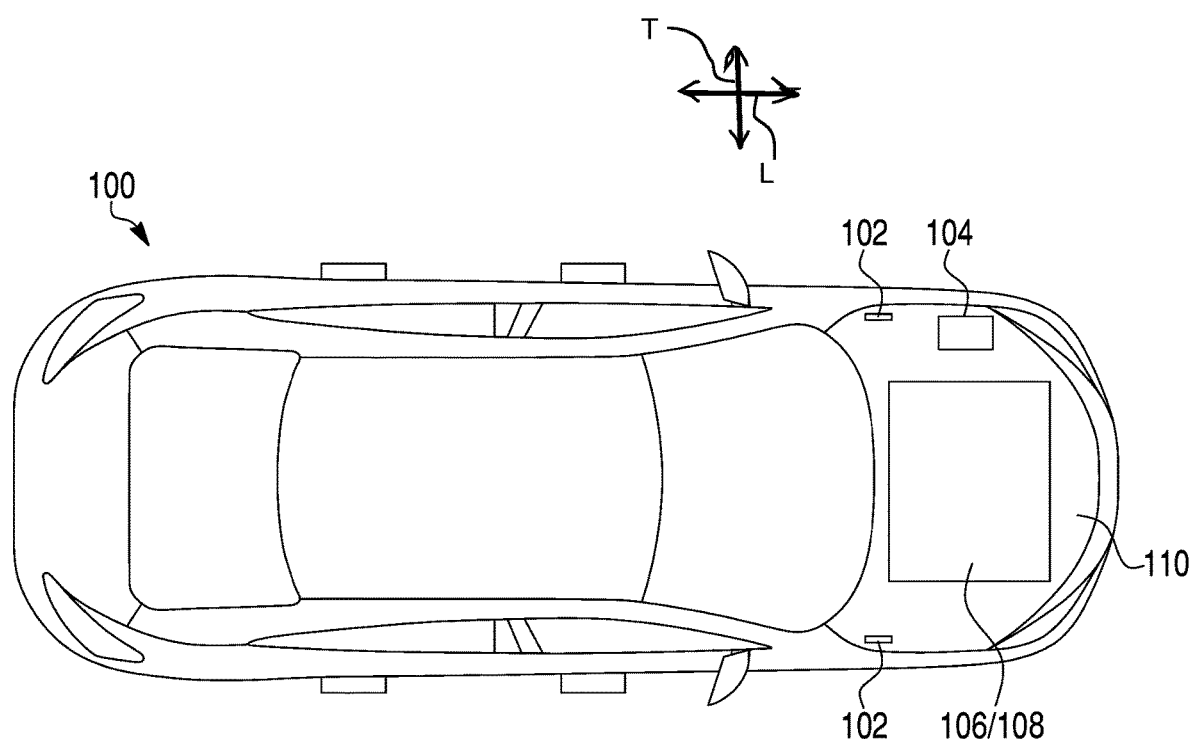
FIG. 1 is a top view of a vehicle made in accordance with principles of the disclosed subject matter.

FIG. 1 illustrates top view of a vehicle 100 made in accordance with principles of the disclosed subject matter. The vehicle 100 can include a vehicle hood 110 that covers at least one of a motor 106 and a storage compartment 108 when in a closed state and provides access to the motor 106 and/or storage compartment 108 when in an opened state. A vehicle hood assembly 102 can include linkage structures located on either side of the hood 110 for allowing the hood 110 to move relative to the vehicle body structure 120 from the closed state to the opened state in a predefined motion profile.

The motor 106 can be an internal combustion engine, an electric motor, pneumatic motor, hydraulic motor, or a hybrid of an internal combustion engine and an electric motor. The motor 106 when configured as an internal combustion engine or a hybrid power source can have the engine output axis oriented in the longitudinal direction L or in the traverse direction T of the vehicle 100. The engine can be mounted forward of the front axles, rearward of the rear axles, or intermediate the front and rear axles. The storage compartment 108 can be configured to contain any number of structures such as a battery 104, a spare wheel, a vehicle controller, a memory, vehicle accessories, and other vehicle structures that are desired to be covered during use of the vehicle 100, and/or can be an empty chamber such as a typical vehicle trunk.

Figure 2:
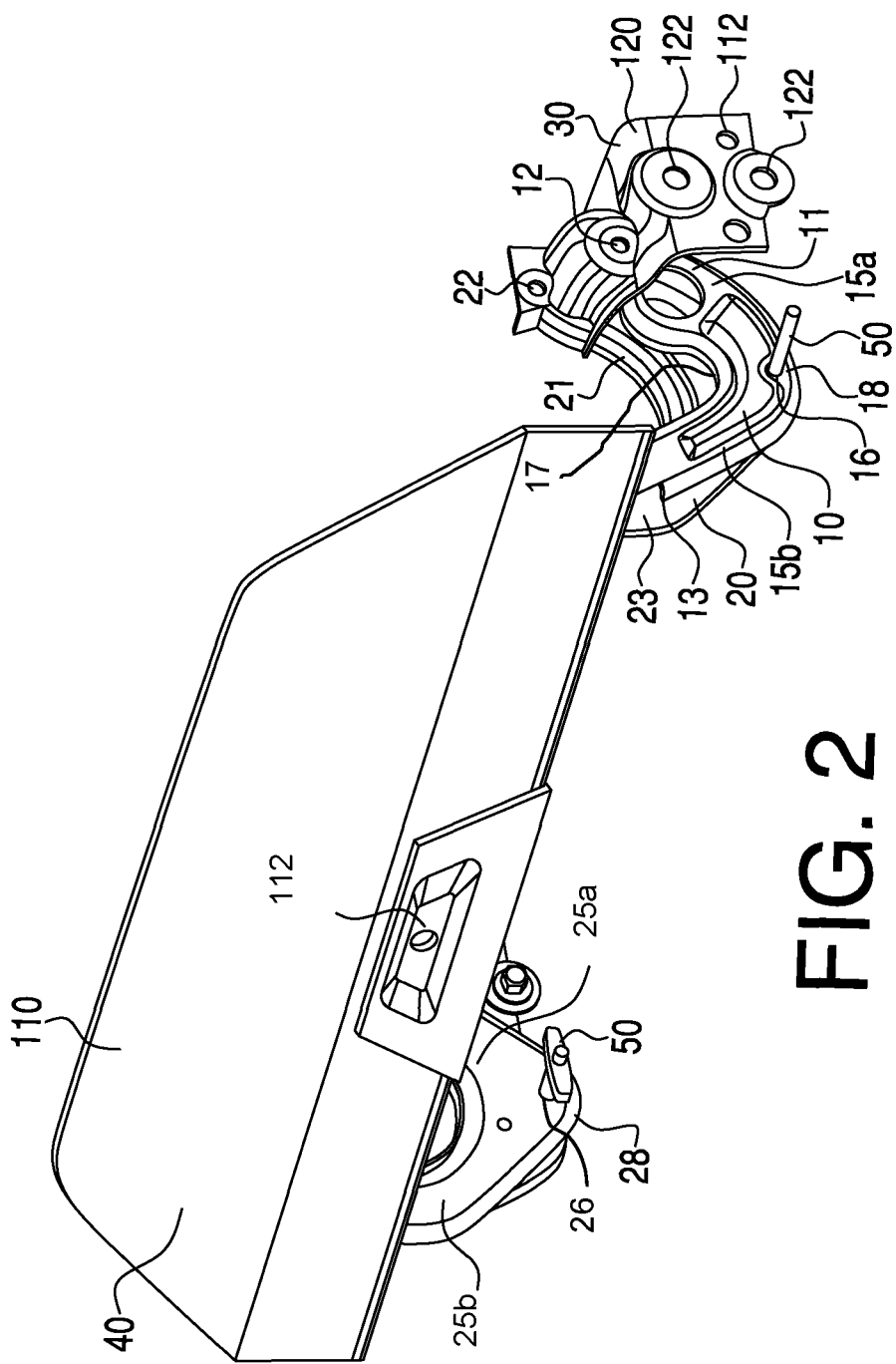
FIG. 2 is a perspective view of a vehicle hood assembly made in accordance with principles of the disclosed subject matter.

FIG. 2 is a perspective view of a vehicle hood assembly 102 made in accordance with principles of the disclosed subject matter. The vehicle hood assembly 102 can include a hood 110 that is connected to a vehicle body structure 120 via at least a first linkage 10 and a second linkage 20. In this embodiment, the vehicle body structure 120 can serve as a third linkage 30 and the hood 110 can serve as a fourth linkage 40. The first linkage 10 can be pivotally connected to the vehicle body structure 120 (and/or third linkage 30) by a first pivot structure 12 located at a first end 11 of the first linkage 10. The first pivot structure 12 allows the first linkage 10 to rotate with respect to the vehicle body structure 120. The first pivot structure 12 can be any known type of pivot structure, such as a pivot joint, including a pivot pin extending or attached to the first linkage 10 and located within an aperture or bearing surface in or on the vehicle body structure 120. Of course, the pin and aperture structures can be reversed (the pin being located or extending from vehicle body structure 120/third linkage 30, and the aperture located in/on the first linkage 10).

The second linkage 20 can be pivotally connected to the vehicle body structure 120 (and/or third linkage 30) by an initial pivot structure 22 located at a first end 21 of the second linkage 20. The initial pivot structure 22 allows the second linkage 20 to rotate with respect to the vehicle body structure 120. The initial pivot structure 22 can be any known type of pivot structure, such as a pivot joint, including a pivot pin extending or attached to the second linkage 20 and located within an aperture or bearing surface in the vehicle body structure 120. Of course, the pin and aperture structures can be reversed (the pin being located or extending from vehicle body structure 120/third linkage 30, and the aperture located in/on the second linkage 20).

The first linkage 10 can be U-shaped having a first leg 15a extending from a first end 11 of the first linkage 10 to a location near a trough of the U-shaped portion of the first linkage 10. An aperture 16 can be located in the trough area of the U-shaped first linkage 10. A second leg 15b can then extend from the trough area of the U-shaped first linkage 10 to an opposite end 13 of the first linkage 10. The first linkage 10 can be pivotally connected to the vehicle hood 110 (and/or fourth linkage 40) by a second (or another) pivot structure 14 (see, for example, FIG. 4) located at the opposite end 13 of the first linkage 10. The second pivot structure 14 allows the first linkage 10 to rotate with respect to the vehicle hood 110 (and/or fourth linkage 40). The second pivot structure 14 can be any known type of pivot structure, such as a pivot joint, including a pivot pin extending or attached to the opposite end 13 of the first linkage 10 and located within an aperture or bearing surface in the vehicle hood 110/fourth linkage 40. Of course, the pin and aperture structures can be reversed (the pin being located or extending from hood 110/fourth linkage 40, and the aperture located in/on the first linkage 10).

The second linkage 20 can also be U-shaped having a first leg 25a extending from a first end 21 of the second linkage 20 to a location near a trough of the U-shaped portion of the second linkage 20. An aperture 26 can be located in the trough area of the U-shaped second linkage 20. A second leg 25b can then extend from the trough area of the U-shaped second linkage 20 to an opposite end 23 of the second linkage 20. The second linkage 20 can be pivotally connected to the vehicle hood 110 by a secondary pivot structure 24 (see, for example, FIG. 4) located at the opposite end 23 of the second linkage 20. The secondary pivot structure 24 allows the second linkage 20 to rotate with respect to the vehicle hood 110 (and/or fourth linkage 40). The secondary pivot structure 24 can be any known type of pivot structure, such as a pivot joint, including a pivot pin extending or attached to the opposite end 23 of the second linkage 20 and located within an aperture or bearing surface in the vehicle hood 110. Of course, the pin and aperture structures can be reversed (the pin being located or extending from hood 110/fourth linkage 40, and the aperture located in/on the second linkage 20).

Figure 3:
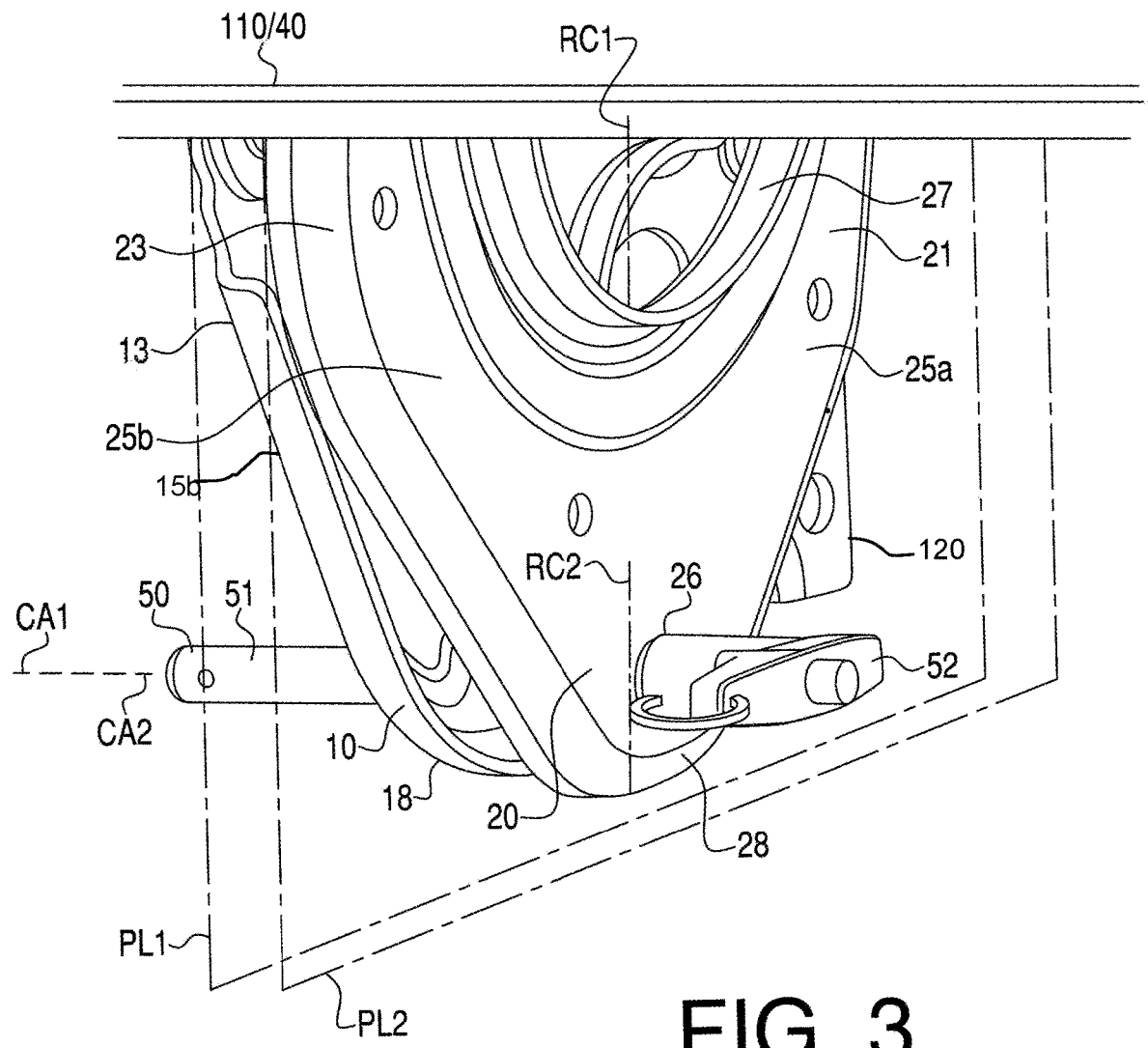
FIG. 3 is a perspective view of a portion of the vehicle hood assembly of FIG. 2.

Referring to FIG. 3, the apertures 16 and 26 located in the first linkage 10 and second linkage 20, respectively, can be located in such a manner that a central axis CA1 of the aperture 16 is co-axial with the central axis CA2 of the aperture 26 only when the hood 110 is in an opened state with respect to the vehicle body structure 120. In this opened state, a key structure 50 can be simultaneously inserted into both apertures 16, 26 to prevent the first linkage 10 from moving with respect to the second linkage 20. In effect, placement of the key structure 50 into the apertures 16, 26 locks the hood 110 in an opened state with respect to the vehicle body structure 120 because all of the first linkage 10, second linkage 20, third linkage 30 (vehicle body structure 120), and fourth linkage 40 (hood 110) are prevented from moving with respect to each other. Thus, the first linkage 10 and second linkage 20 are geometrically configured such that the central axis CA1 and central axis CA2 pass over each other (become co-axial) only when the hood 110 and vehicle body structure 120 are in an opened state at which it is desirable to lock their relative movement. When key structure 50 is not located in the apertures 16, 26, the vehicle body structure 120 and hood 110 can be moved from the opened state such that the central axis CA1 and central axis CA2 are spaced from each other (and are substantially parallel with respect to each other). The key structure 50 can be placed into a snap fit structure 112 (see FIG. 2) in the hood 110 or in the vehicle body structure 120. The snap fit structure 112 can be an aperture into which a shaft 51 of the key structure 50 is placed, or can be indents into which the shaft 51 or handle 52 of the key structure 50 snugly fits into a friction type lock, or can be elastic bands that retain the key structure in place. The snap fit structure 112 can be located on the hood 110, the vehicle body structure 120, both, or any other structure on the vehicle 100 that is convenient for a user for a particular application.

The vehicle body structure 120 is shown as a separate structure that can be attached to a vehicle frame or fender or other vehicle structure by, for example, bolts that are inserted into connection apertures 122 and then connected to a vehicle frame or other structure. Of course, the vehicle body structure 120 can be the vehicle frame itself or can be other portions of the vehicle (fender, attachment beams, attachment structures) to which the first linkage 10 and second linkage 20 can be attached in a manner such that the first linkage 10 and second linkage 20 can rotate with respect to the vehicle body structure 120, each other, and/or vehicle 100 itself.

FIG. 3 is a perspective view of a portion of the vehicle hood assembly of FIG. 2 that more clearly shows an example of the specific geometry for the first linkage 10 and second linkage 20. In this embodiment, the second linkage 20 includes a U-shaped body that extends from a first end 21 along the first leg 25a towards a trough in the U-shaped body at which aperture 26 is located, and then continues to extend along the second leg 25b to an opposite end 23 of the second linkage 20. A portion of an upper peripheral edge 27 can have a radius of curvature RC1 and form the trough of the U-shaped portion. A portion of a lower peripheral edge 28 can have a radius of curvature RC2 and form the trough of the U-shaped portion. The radius of curvature RC1 can be larger than the radius of curvature RC2. Thus, the lower peripheral edge 28 forms a deeper U-shape trending towards a V-shape as compared to the upper peripheral edge 27, causing the lowermost peripheral edge of the second linkage 20 to extend downward in a peninsula like formation extending further away from a central longitudinal axis of the second linkage 20 than does the upper peripheral edge 27. The aperture 26 can be located in this peninsula like formation. The second linkage 20 can be formed from stamped metal or can be a molded form and can include a rib located at the upper peripheral edge 27 to provide greater torsional strength and stability for the second linkage 20.

The first linkage 10 also includes a U-shaped body that extends from a first end 11 (see FIG. 2) along the first leg 15a (see FIG. 2) towards a trough in the U-shaped body at which aperture 16 is located, and then continues to extend along the second leg 15b to an opposite end 13 of the first linkage 10. A portion of an upper peripheral edge 17 (FIG. 2) can have a radius of curvature and form the trough of the U-shaped body. That is, the upper peripheral edge 17 can include a semi-circular portion. A portion of a lower peripheral edge 18 can have a radius of curvature and form the trough of the U-shaped body. That is, the lower peripheral edge 18 can include a semi-circular portion. The radius of curvature of the upper periphery edge 17 can be larger than the radius of curvature of the lower peripheral edge 18. Thus, lower peripheral edge 18 forms a deeper U-shape trending towards a V-shape as compared to the upper peripheral edge 17, causing the lowermost peripheral edge 18 of the first linkage 10 to extend downward in a peninsula like formation extending further away from a central longitudinal axis of the first linkage 10 than does the upper peripheral edge 17. The aperture 26 can be located in this peninsula like formation. The second linkage 20 can be formed from stamped metal or can be a molded form and can include a rib located at the upper peripheral edge 17 to provide greater torsional strength and stability for the first linkage 10.

The first linkage 10 can include various structures that are all located within a first plane PL1. For example, the aperture 16 and pivot joints 12, 14 can all be located within plane PL1. By contrast, a face of the first linkage can be located in and define plane PL1, or the upper peripheral edge 17 and/or lower peripheral edge 18 can define plane PL1, or any combination thereof can define plane PL1. The plane PL1 can also be considered to be a plane that includes the longitudinal axis of the first linkage 10.

The second linkage 20 can include various structures that are all located within a second plane PL2. For example, the aperture 26 and pivot joints 22, 24 can all be located within plane PL2. By contrast, a face of the second linkage can be located in and define plane PL2, or the upper peripheral edge 27 and/or lower peripheral edge 28 can define plane PL2, or any combination thereof can define plane PL2. The plane PL2 can also be considered to be a plane that includes the longitudinal axis of the second linkage 20.

The first linkage 10 and second linkage 20 can be configured (and moveably attached to the hood 110 and vehicle body structure 120) such that planes PL1 and PL2 are substantially parallel (e.g., parallel or slightly off parallel by about +/−10 degrees) with respect to each other. Thus, the first linkage 10 and second linkage 20 face each other and rotate (and/or translate) within planes PL1 and PL2, respectively.

Figure 4:
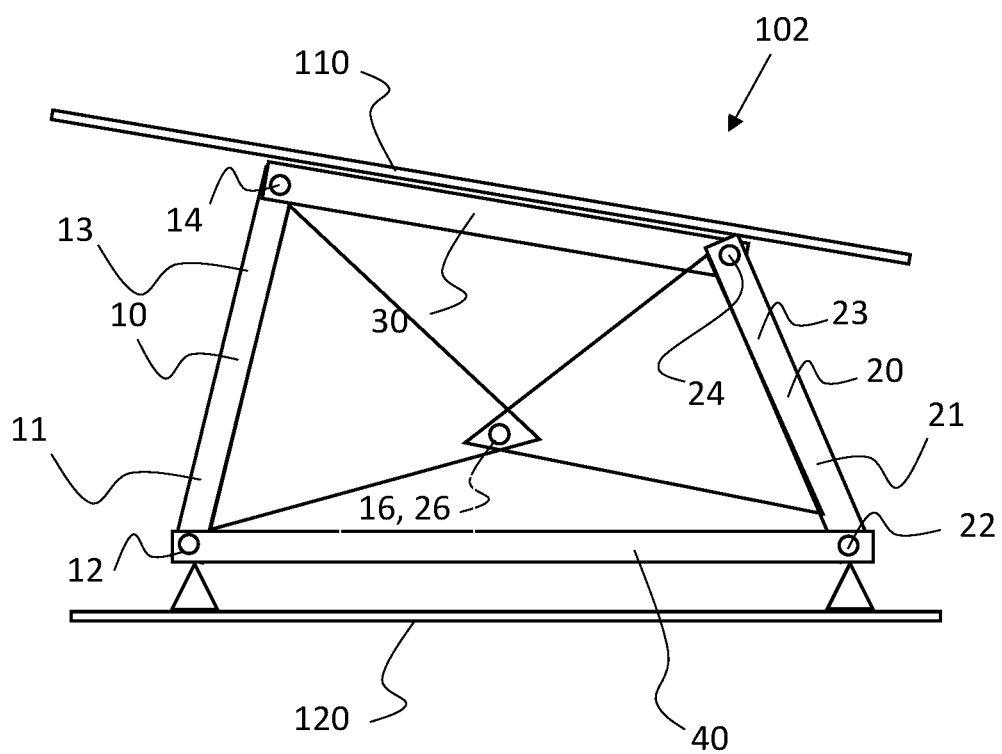
FIG. 4 is a schematic illustration of a vehicle hood assembly made in accordance with principles of the disclosed subject matter.

FIG. 4 is a schematic illustration of another vehicle hood assembly 102 made in accordance with principles of the disclosed subject matter. The vehicle hood 110 is attached to the vehicle body structure 120 via a four bar linkage. A first linkage 10 is rotatably connected to the vehicle body structure 120 (and/or fourth linkage 40) at pivot joint 12 located at a first end 11 of the first linkage 10. The vehicle hood 110 (and/or third linkage 30) is rotatably attached to the first linkage 10 at pivot joint 14 located at an opposite end 13 of the first linkage 10. In this embodiment, the vehicle hood 110 is positively attached in a fixed or non-moveable relationship to the third linkage 30. In some embodiments, the vehicle hood 110 or attachment structure connected to the vehicle hood 110 can be considered to be the third linkage 30 itself. Similarly, in some embodiments, the vehicle body structure 120 or attachment structure connected to the vehicle body structure 120 can be considered to be the fourth linkage 40 itself.

A second linkage 20 is rotatably connected to the vehicle hood 110 (and/or third linkage 30) at pivot joint 24 located at an opposite end 23 of the second linkage 10. The vehicle body structure 120 (and/or fourth linkage 40) is rotatably attached to the second linkage 20 at pivot joint 22 located at a first end 21 of the second linkage 20. In this embodiment, the vehicle hood 110 is positively attached in a fixed or non-moveable relationship to the third linkage 30. The vehicle hood 110 or an attachment structure located on the vehicle hood 110 can be considered to be the third linkage 30 itself. Because this figure is schematic, the U-shaped geometry of each of the first linkage 10 and second linkage 20 is not shown, but can be incorporated into this embodiment as desired. The first linkage 10 includes an aperture 16 located between the first end 11 and opposite end 13, and the second linkage 20 includes an aperture 26 located between the first end 21 and opposite end 23. The triangular portions extending from each of the first linkage 10 and second linkage 20 towards each other such that the apertures 16, 26 are intended to be a schematic showing of the linkages 10, 20 in which apertures 16, 26 are permitted to overlap (e.g., have co-axial central axes). The specific geometry can be that shown in FIGS. 2 and 3 or various other geometries that allow for overlap of the apertures 16, 26 at an opened state, and causes the central axis of each aperture 16, 26 to be spaced from each other when move from the opened state and/or in a closed state.

Figure 5:
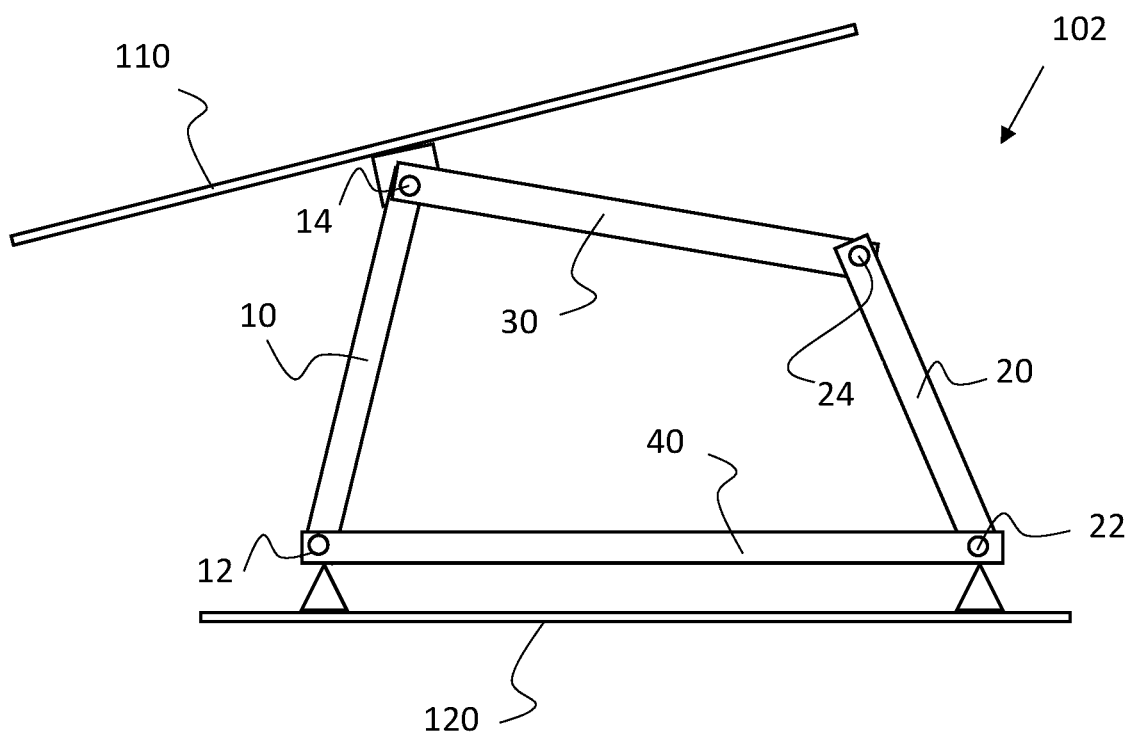
FIG. 5 is a schematic illustration of a vehicle hood assembly made in accordance with principles of the disclosed subject matter.

FIG. 5 is a schematic illustration of another vehicle hood assembly 102 made in accordance with principles of the disclosed subject matter. This embodiment can be constructed in a similar manner as described above with respect to FIG. 4. However, in this embodiment, the vehicle hood 110 can be rotatably attached to the third linkage and/or first linkage 10 at pivot joint 14. Thus, the vehicle hood 110 is not fixedly attached to the third linkage 30 and is considered a separate structure that is moveable with respect to the third linkage 30.

Figure 6:
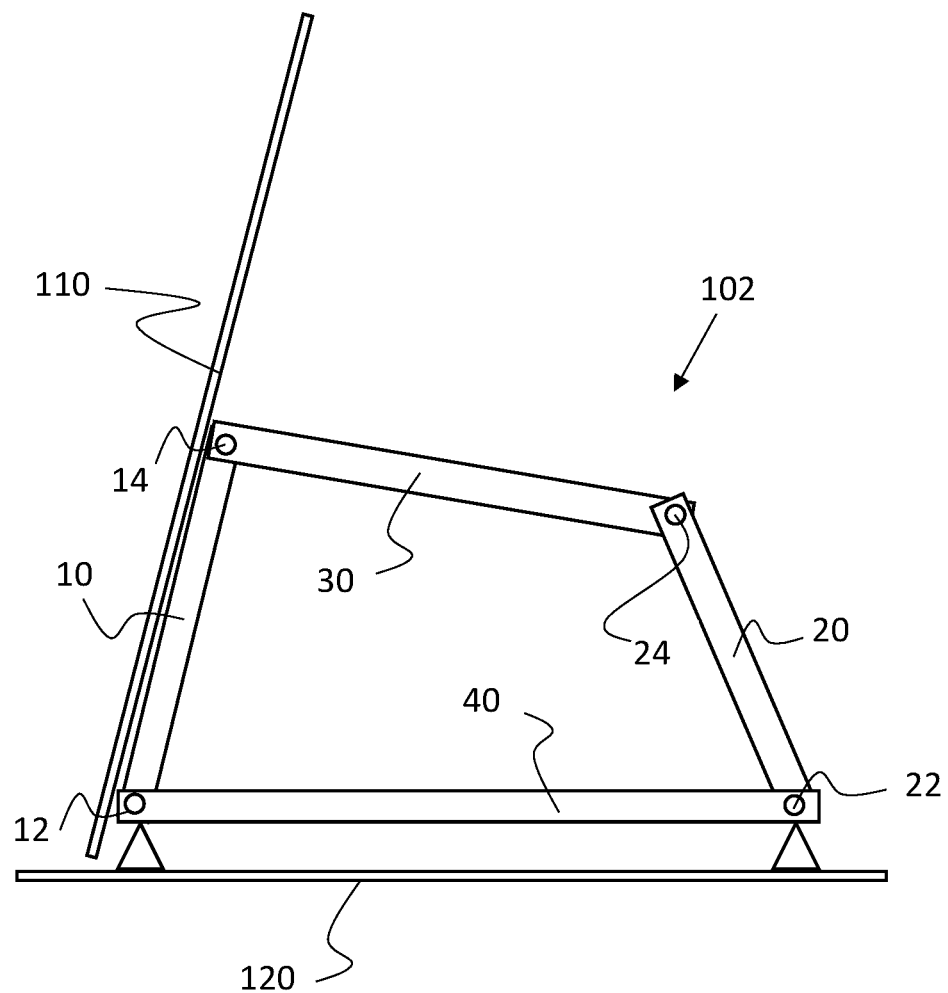
FIG. 6 is a schematic illustration of another vehicle hood assembly made in accordance with principles of the disclosed subject matter.

FIG. 6 is a schematic illustration of another vehicle hood assembly 102 made in accordance with principles of the disclosed subject matter. This embodiment can be constructed in a similar manner as described above with respect to FIG. 4. However, in this embodiment, the vehicle hood 110 can be fixedly attached to the first linkage 10 such that vehicle hood 110 is not moveable with respect to the first linkage. Thus, the vehicle hood 110 is rotatably attached to the vehicle body structure 120 via pivot joint 12, and is separately rotatably attached to the third linkage 30 at pivot joint 14.

Figure 7:
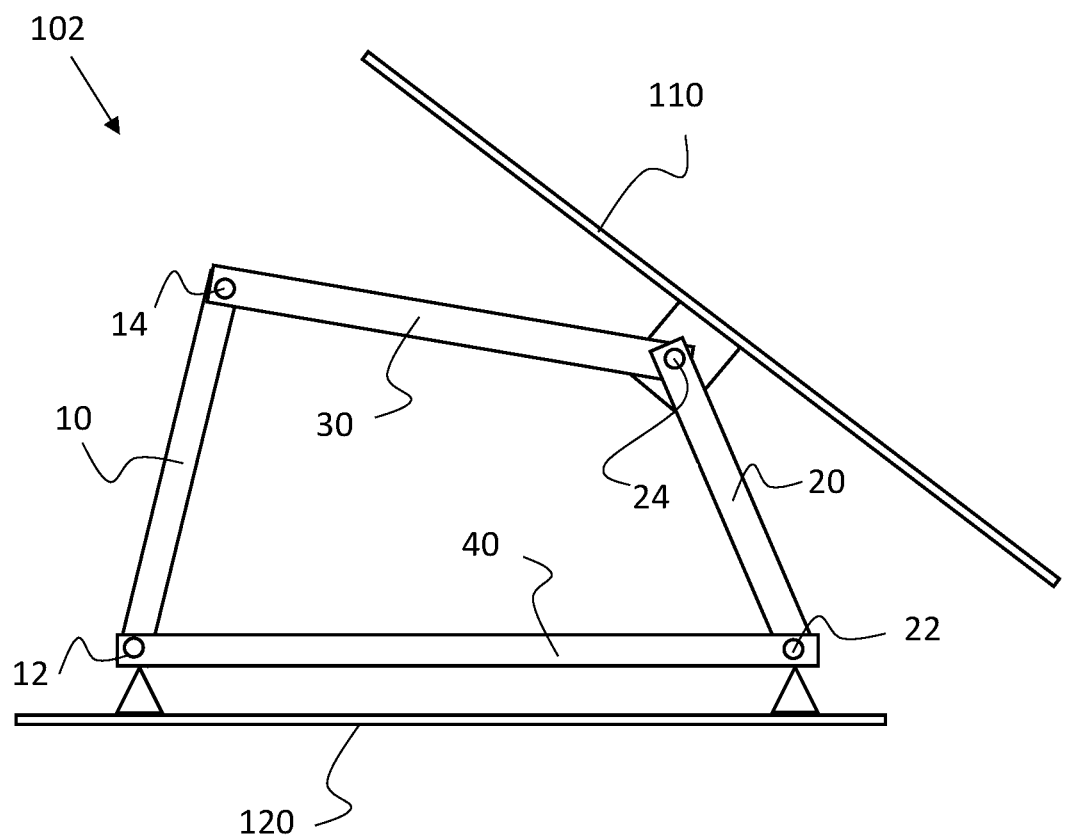
FIG. 7 is a schematic illustration of another vehicle hood assembly made in accordance with principles of the disclosed subject matter.

FIG. 7 is a schematic illustration of another vehicle hood assembly 102 made in accordance with principles of the disclosed subject matter. This embodiment can be constructed in a similar manner as described above with respect to FIG. 4. However, in this embodiment, the vehicle hood 110 can be rotatably attached to the third linkage 30 and/or second linkage 20 at pivot joint 24. Thus, the vehicle hood 110 is not fixedly attached to the third linkage 30 and is considered a separate structure that is moveable with respect to the third linkage 30.

Figure 8:
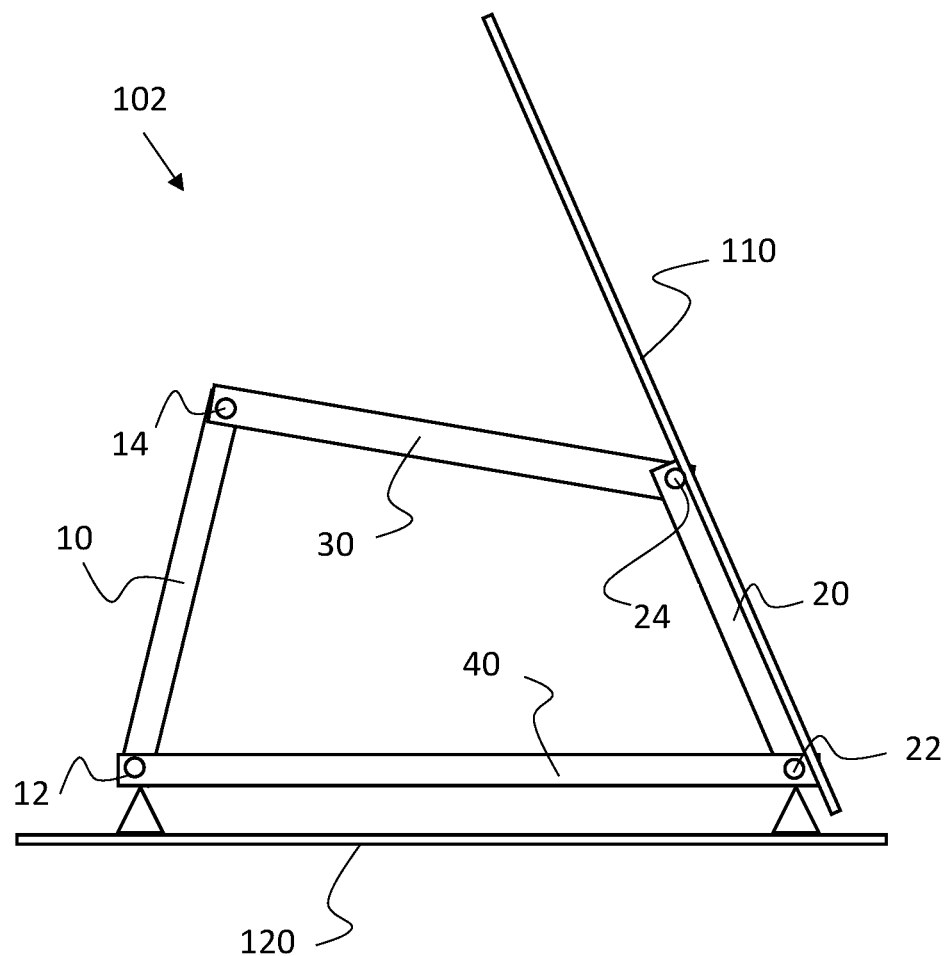
FIG. 8 is a schematic illustration of another vehicle hood assembly made in accordance with principles of the disclosed subject matter.

FIG. 8 is a schematic illustration of another vehicle hood assembly 102 made in accordance with principles of the disclosed subject matter. This embodiment can be constructed in a similar manner as described above with respect to FIG. 4. However, in this embodiment, the vehicle hood 110 can be fixedly attached to the second linkage 20 such that vehicle hood 110 is not moveable with respect to the second linkage 20. Thus, the vehicle hood 110 is rotatably attached to the vehicle body structure 120 via pivot joint 22, and is separately rotatably attached to the third linkage 30 at pivot joint 24.

Figure 9:
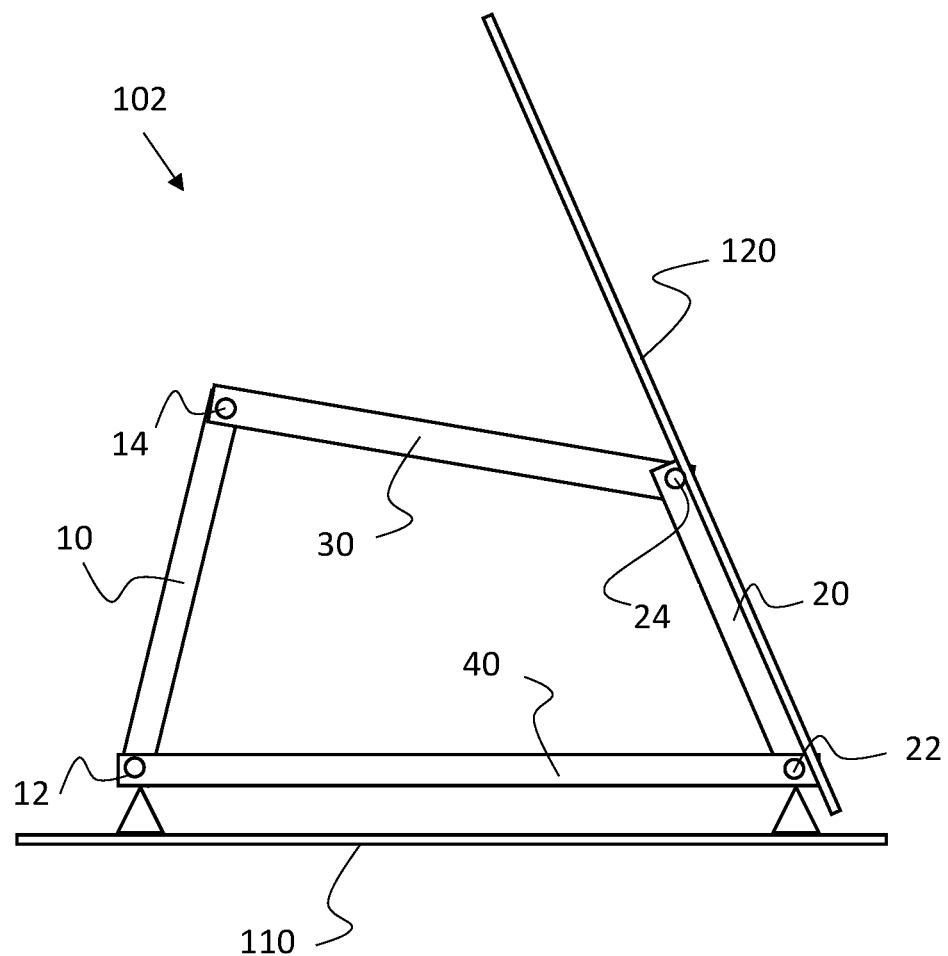
FIG. 9 is a schematic illustration of another vehicle hood assembly made in accordance with principles of the disclosed subject matter.

FIG. 9 is a schematic illustration of another vehicle hood assembly 102 made in accordance with principles of the disclosed subject matter. This embodiment can be constructed in a similar manner as described above with respect to FIG. 4. However, in this embodiment, the vehicle body structure 120 can be fixedly attached to the second linkage 20 such that vehicle body structure 120 is not moveable with respect to the second linkage 20. Thus, the vehicle body structure 120 is rotatably attached to the vehicle hood 110 via pivot joint 22, and is separately rotatably attached to the third linkage 30 at pivot joint 24.

Figure 10:
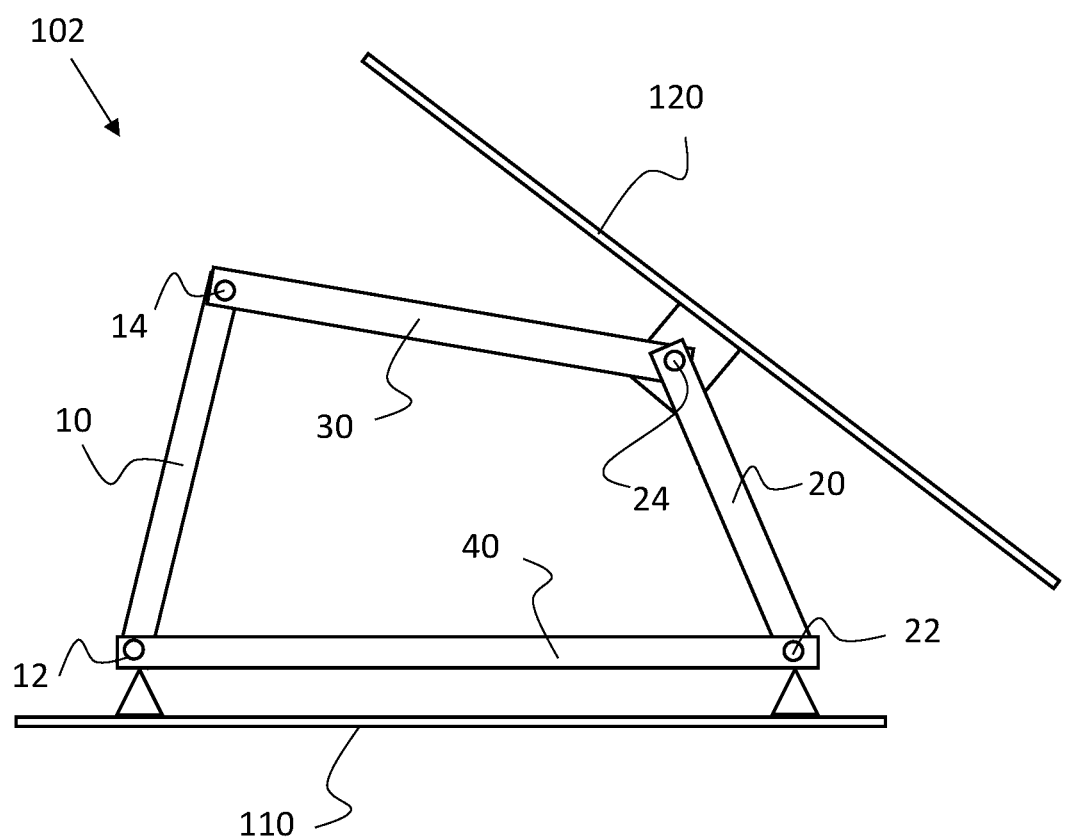
FIG. 10 is a schematic illustration of another vehicle hood assembly made in accordance with principles of the disclosed subject matter.

FIG. 10 is a schematic illustration of another vehicle hood assembly 102 made in accordance with principles of the disclosed subject matter. This embodiment can be constructed in a similar manner as described above with respect to FIG. 4. However, in this embodiment, the vehicle body structure 120 can be rotatably attached to the third linkage 30 and/or second linkage 20 at pivot joint 24. Thus, the vehicle body structure 120 is not fixedly attached to the third linkage 30 and is considered a separate structure that is moveable with respect to the third linkage 30.

Figure 11:
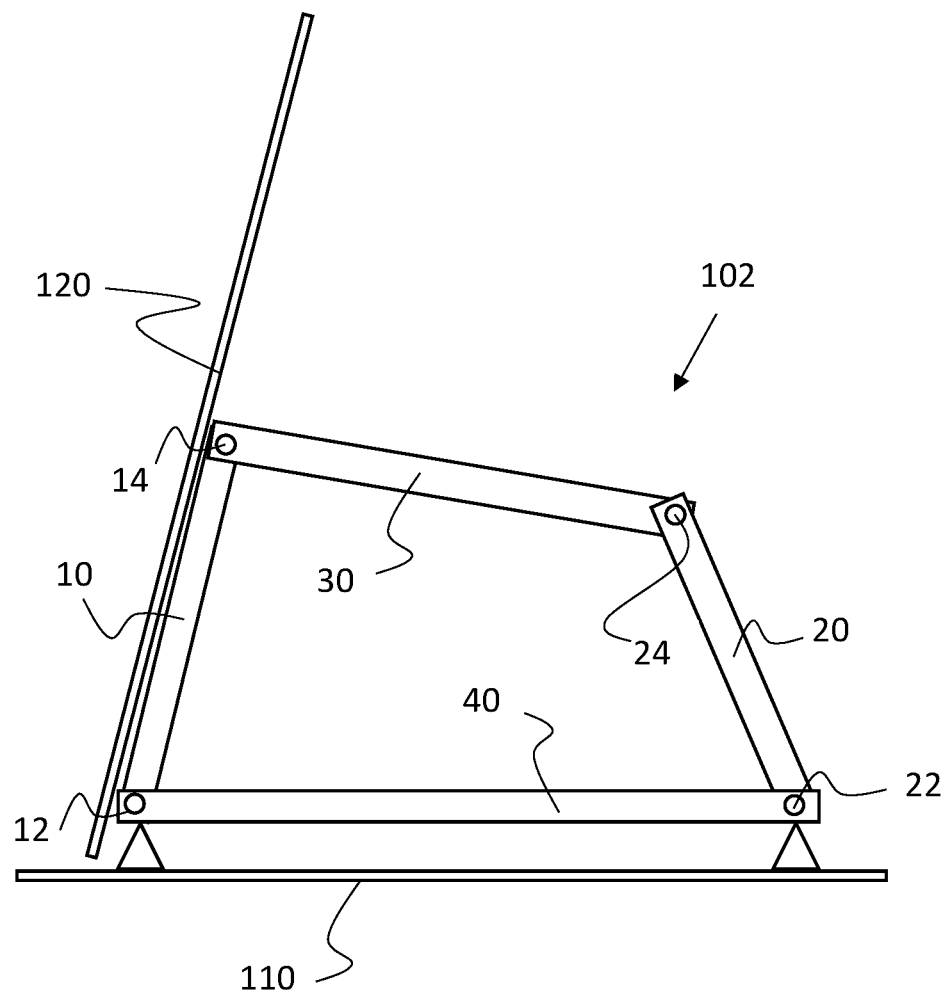
FIG. 11 is a schematic illustration of another vehicle hood assembly made in accordance with principles of the disclosed subject matter.

FIG. 11 is a schematic illustration of another vehicle hood assembly 102 made in accordance with principles of the disclosed subject matter. This embodiment can be constructed in a similar manner as described above with respect to FIG. 4. However, in this embodiment, the vehicle body structure 120 can be fixedly attached to the first linkage 10 such that vehicle body structure 120 is not moveable with respect to the first linkage 10. Thus, the vehicle body structure 120 is rotatably attached to the vehicle hood 110 via hinge pivot joint 12, and is separately rotatably attached to the third linkage 30 at hinge pivot joint 14.

Figure 12:
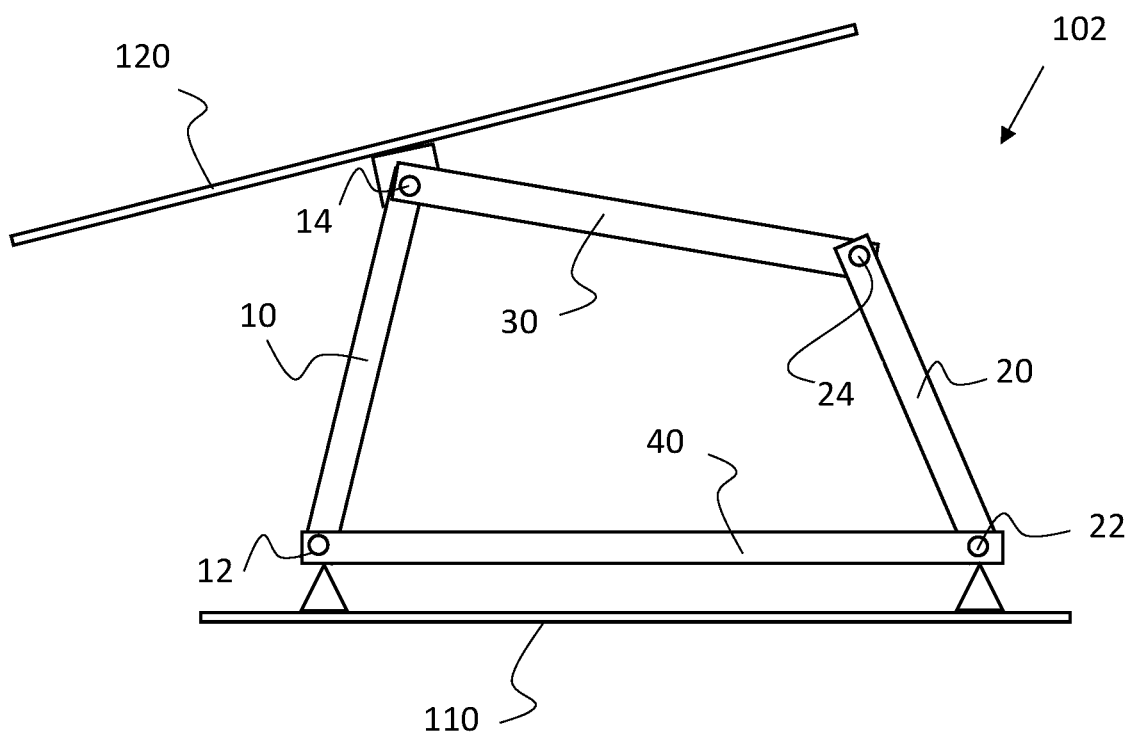
FIG. 12 is a schematic illustration of another vehicle hood assembly made in accordance with principles of the disclosed subject matter.

FIG. 12 is a schematic illustration of another vehicle hood assembly 102 made in accordance with principles of the disclosed subject matter. This embodiment can be constructed in a similar manner as described above with respect to FIG. 4. However, in this embodiment, the vehicle body structure 120 can be rotatably attached to the third linkage 30 and/or first linkage 10 at joint 14. Thus, the vehicle body structure 120 is not fixedly attached to the third linkage 30 and is considered a separate structure that is moveable with respect to the third linkage 30. In this embodiment, as well as the embodiments shown in FIGS. 5, 7 and 10, the hood 110 and/or vehicle body structure 120 can be separately rotatably and/or moveably (e.g., via cam surface) connected to a portion of the vehicle not shown in the figures to provide a guide for the movement of the hood 110 and/or vehicle body structure 120.

Figure 13:
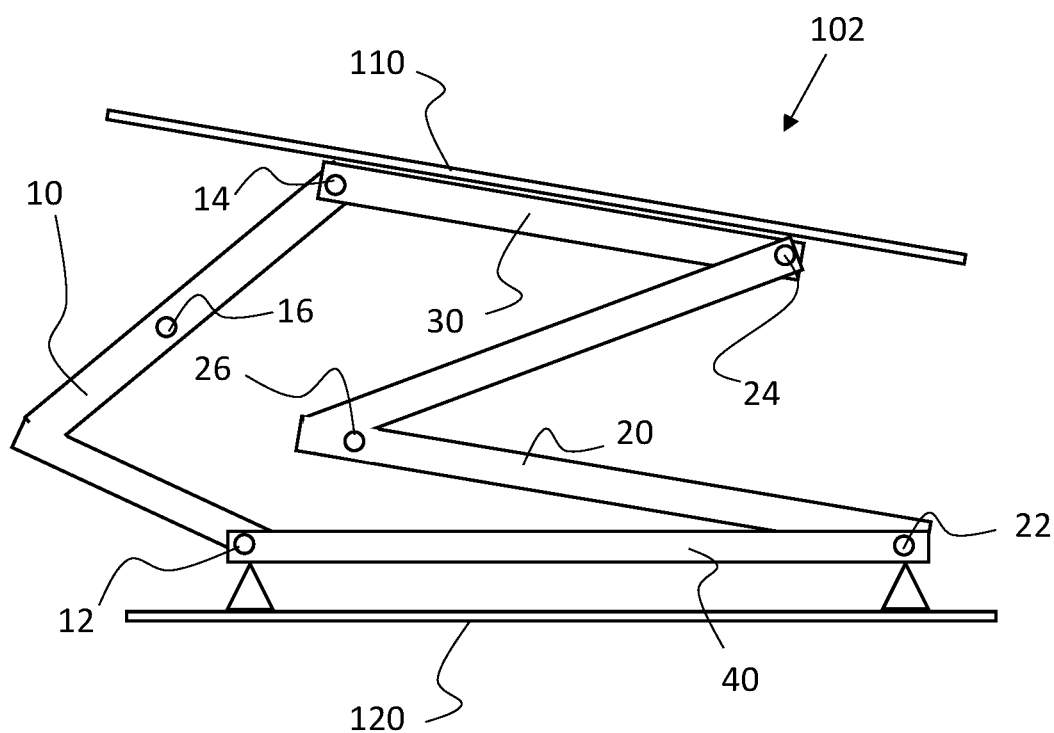
FIG. 13 is a schematic illustration of another vehicle hood assembly made in accordance with principles of the disclosed subject matter.

FIG. 13 is a schematic illustration of another vehicle hood assembly 102 made in accordance with principles of the disclosed subject matter. In this embodiment, the first linkage 10 and second linkage are shown as substantially L-shaped as compared to the embodiment of FIG. 2. The apertures 16, 26 are shown in each linkage 10, 20, respectively. It is noted that aperture 16 is offset from the "trough" of the L-shaped portion of the linkage 10. This configuration can be applied to any of the embodiments disclosed herein. Similarly, aperture 26 can be offset from the trough, and applied to any of the embodiments disclosed herein.

While certain embodiments of the invention are described above, it should be understood that the invention can be embodied and configured in many different ways without departing from the spirit and scope of the invention.

The disclosed vehicle hood apparatus and method can be used with any vehicle that is configured for travel along any one or combination of improved, unimproved, and unmarked paths. For example, embodiments are intended to include or otherwise cover any type of vehicle, including a passenger car, minivan, truck, other types of all-terrain vehicle (ATV), semi-tractor, off-highway vehicle, etc. The disclosed subject matter can also be used in vehicles such as boats, planes, trains, rockets, and any other type of vehicle in which a compartment has a hood that can be moved from a closed state to an opened state with respect to the vehicle body.

Embodiments are disclosed above in the context of a manually adjustable hood. However, the disclosed subject matter is intended to cover automatically adjustable hoods, including mechanisms that use or otherwise include motors, pneumatics, hydraulics, controllers, processors, etc., to automatically control the motion of the hood 110 relative to the vehicle body structure 120.

The disclosed subject matter is also intended to include or otherwise cover methods of using and methods of manufacturing the disclosed vehicle hood assembly 102. An exemplary method can include providing a first linkage 10 and second linkage 20 connected between a hood 110 and vehicle body structure 120. The first linkage 10 including an aperture 16 therein, and the second linkage 20 including an aperture 26 therein. Moving the hood 110 with respect to the vehicle body structure 120 from a closed state in which a central axis CA1 of the aperture 16 is spaced from a central axis CA2 of the aperture 26, to an opened state in which a central axis CA1 of the aperture 16 is co-axial with a central axis CA2 of the aperture 26. Once the hood 110 and vehicle body structure 120 are located in the opened state, simultaneously inserting a key structure 50 into both apertures 16 and 26 to achieve a locked state in which the hood 110 is prevented from moving with respect to the vehicle body structure 120. It is also contemplated that the first linkage 10 includes a plurality of apertures 16 and/or the second linkage 20 includes a plurality of apertures 26. Thus, when any central axis of one of the plurality of apertures 16 becomes coaxial with a central axis of any one of the plurality of apertures 26, this can be considered an opened state and the key structure 50 be inserted into those coaxial apertures 16, 26. Thus, there may be a plurality of opened states in which the hood 110 can be locked with respect to the vehicle body structure 120.

The linkages 10, 20, 30, 40 can be made from various materials and still fall within the scope of the presently disclosed subject matter. For example, the linkages 10, 20, 30, 40 can be formed from stamped metal, molded metal, can be unitary parts or multiple parts attached together via fasteners, adhesives, or welds, and can be made from plastics, ceramics, recycled metal, wood, plastics, metals, and/or combinations thereof.

The key structure 50 is shown as a T-shaped structure having a cylindrical shaft 51 extending from handle 52. However, it is contemplated that the key structure 50 (and apertures 16, 26) can be formed with various different geometries provided they substantially match each other to ensure locking of the linkages 10, 20. For example, the apertures can be various other geometric shapes (ovals, squares, rectangles, stars, etc.) or can be non-symmetrical when viewed along their central axes CA1, CA2. Then the shaft 51 of the key structure can be similarly formed in a cross-section taken perpendicular to a longitudinal axis of the shaft 51.

The order in which each of the linkages 10, 20, 30, 40 are attached to each other and the vehicle can vary. For example, the linkages 10, 20 are shown as disposed in a left to right order as viewed in FIG. 3. However, the linkages 10, 20 can be attached to the vehicle hood 110 and vehicle body structure 120 such that the first linkage 10 is disposed on the right of the second linkage 20 as viewed in FIG. 3.

The vehicle hood assembly 102 can include a second set of linkages 10, 20, 30, 40 located at a different location on the vehicle hood 110 and vehicle body structure 120 to provide a second hinge structure for the vehicle hood 110 of vehicle 100. Any number of additional linkages 10, 20, 30 and 40 can provided depending on application and weight and/or geometrical requirements.

The pivot joints 12, 14, 22, 24 can be simple post and aperture type rotational connection structures. However, it is contemplated that the pivot joints 12, 14, 22, 24 can include cam and follower type connections, bearing and post connections, as well as other connections that permit rotational and/or translation motion between each of the linkages 10, 20, 30, 40 as desired for a particular application.

While the subject matter has been described in detail with reference to exemplary embodiments thereof, it will be apparent to one skilled in the art that various changes can be made, and equivalents employed, without departing from the scope of the invention.

What is claimed is:

1. A vehicle hood assembly, comprising:
a vehicle body structure;
a hood moveable with respect to the vehicle body structure from a closed state to an opened state;
a first linkage connecting the hood to the vehicle body structure and configured to move within a first plane, the first linkage including a first linkage aperture extending through the first linkage in a direction substantially perpendicular to the first plane;
a second linkage connecting the hood to the vehicle body structure and configured to move within a second plane, the second linkage including a second linkage aperture extending through the second linkage in a direction substantially perpendicular to the second plane, the second plane being substantially parallel to the first plane, wherein
the second linkage and first linkage are configured such that a central axis of the first linkage aperture is coaxial with a central axis of the second linkage aperture if the hood is in the opened state, and are configured such that the central axis of the first linkage aperture is spaced from the central axis of the second linkage aperture if the hood is moved from opened state; and
a key structure configured to simultaneously fit into both the second linkage aperture and the first linkage aperture if the hood is in the opened state.

2. The vehicle hood assembly of claim 1, wherein the first linkage and the second linkage are configured such that the key structure does not simultaneously fit into both the second linkage aperture and the first linkage aperture if the hood is at least one of spaced from the opened state and in the closed state.

3. The vehicle hood assembly of claim 1, wherein the first linkage is a U-shaped structure that includes a pivot joint located at a first end of the U-shaped structure and another pivot joint located at an opposite end of the U-shaped structure, and the first linkage aperture is located between the first end and the opposite end of the U-shaped structure.

4. The vehicle hood assembly of claim 3, wherein the U-shaped structure includes an upper semi-circular peripheral edge having a first radius of curvature and includes a lower semi-circular peripheral edge having a second radius of curvature that is smaller than the first radius of curvature.

5. The vehicle hood assembly of claim 4, wherein the first radius of curvature has a first central axis and the second radius of curvature has a second central axis, and the first central axis, second central axis, and central axis of the first linkage aperture are located on a straight line.

6. The vehicle hood assembly of claim 1, wherein the first linkage is an L-shaped structure that includes a pivot joint located at a first end of the L-shaped structure and another pivot joint located at an opposite end of the L-shaped structure, and the first linkage aperture is located between the first end and opposite end of the L-shaped structure.

7. The vehicle hood assembly of claim 6, wherein the L-shape structure includes a first leg extending from the pivot joint to the first linkage aperture and a second leg extending from the another pivot joint to the first linkage aperture, the first leg having a longitudinal axis that intersects a longitudinal axis of the second leg.

8. The vehicle hood assembly of claim 1, further comprising:
   a third linkage connected between the first linkage and second linkage, the third linkage rotatable with respect to at least one of the first linkage and second linkage; and
   a fourth linkage connected between the first linkage and second linkage, the fourth linkage rotatable with respect to at least one of the first linkage and second linkage.

9. The vehicle hood assembly of claim 1, wherein the key structure is a T-shaped pin that includes a shaft portion having a longitudinal axis and a handle portion that has a longitudinal axis substantially perpendicular to the longitudinal axis of the shaft.

10. The vehicle hood assembly of claim 1, wherein at least one of the vehicle body structure and the hood includes a snap fit structure configured to hold the key structure.

11. The vehicle hood assembly of claim 1, wherein the hood is configured for placement over at least one of:
    an engine compartment; and
    a storage compartment.

12. A vehicle hood assembly, comprising:
    a vehicle body structure;
    a hood moveable with respect to the vehicle body structure from a closed state to an opened state;
    a first U-shaped linkage connecting the hood to the vehicle body structure, the first U-shaped linkage including a first U-shaped linkage aperture extending through the first U-shaped linkage;
    a second U-shaped linkage connecting the hood to the vehicle body structure, the second U-shaped linkage including a second U-shaped linkage aperture extending through the second linkage, wherein
    the second U-shaped linkage and first U-shaped linkage are configured such that a central axis of the first U-shaped linkage aperture is coaxial with a central axis of the second U-shaped linkage aperture if the hood is in the opened state, and are configured such that the central axis of the first U-shaped linkage aperture is spaced from the central axis of the second U-shaped linkage aperture if the hood is moved from opened state; and
    a key structure configured to simultaneously fit into both the second U-shaped linkage aperture and the first U-shaped linkage aperture if the hood is in the opened state.

13. The vehicle hood assembly of claim 12, wherein the first U-shaped linkage and the second U-shaped linkage are configured such that the key structure does not simultaneously fit into both the second U-shaped linkage aperture and the first U-shaped linkage aperture if the hood is at least one of spaced from the opened state and in the closed state.

14. The vehicle hood assembly of claim 12, wherein the first U-shaped linkage includes a pivot joint located at a first end of the U-shaped linkage and another pivot joint located at an opposite end of the U-shaped linkage, and the first U-shaped linkage aperture is located between the first end and opposite end of the U-shaped linkage.

15. The vehicle hood assembly of claim 14, wherein the U-shaped linkage includes an upper semi-circular peripheral edge having a first radius of curvature and includes a lower semi-circular peripheral edge having a second radius of curvature that is smaller than the first radius of curvature.

16. The vehicle hood assembly of claim 15, wherein the first radius of curvature has a first central axis and the second radius of curvature has a second central axis, and the first central axis, second central axis, and central axis of the first U-shaped linkage aperture are located on a straight line.

17. The vehicle hood assembly of claim 14, wherein the U-shaped linkage includes a first leg extending from the pivot joint to the first linkage aperture and a second leg extending from the another pivot joint to the first linkage aperture, the first leg having a longitudinal axis that intersects a longitudinal axis of the second leg.

18. The vehicle hood assembly of claim 12, further comprising:
    a third linkage connected between the first U-shaped linkage and second U-shaped linkage, the third linkage rotatable with respect to at least one of the first U-shaped linkage and second U-shaped linkage; and
    a fourth linkage connected between the first U-shaped linkage and second U-shaped linkage, the fourth linkage rotatable with respect to at least one of the first U-shaped linkage and second U-shaped linkage.

19. A vehicle hood assembly, comprising:
    a vehicle body structure;
    a hood configured for placement over at least one of,
        an engine compartment, and
        a storage compartment, and moveable with respect to the vehicle body structure from a closed state to an opened state;
    a first linkage connecting the hood to the vehicle body structure and including a first pivot structure about which the first linkage is rotatable and a second pivot structure about which the first linkage is rotatable, the first linkage including a first linkage aperture extending through the first linkage and located between the first pivot structure and second pivot structure, wherein the first pivot structure, second pivot structure and first linkage aperture are located within a first plane;
    a second linkage connecting the hood to the vehicle body structure and including an initial pivot structure about which the second linkage is rotatable and a secondary pivot structure about which the second linkage is rotatable, the second linkage including a second linkage aperture extending through the second linkage and located between the initial pivot structure and secondary pivot structure, wherein the initial pivot structure, secondary pivot structure and second linkage aperture are located within a second plane that is substantially parallel with the first plane, wherein
    the second linkage and the first linkage are configured such that a central axis of the first linkage aperture is coaxial with a central axis of the second linkage aperture if the hood is in the opened state, and are configured such that the central axis of the first linkage aperture is spaced from the central axis of the second linkage aperture if the hood is moved from opened state; and
    a key structure configured to simultaneously fit into both the second linkage aperture and the first linkage aperture if the hood is in the opened state.

20. The vehicle hood assembly of claim 19, further comprising:

a third linkage connected between the first linkage and second linkage, the third linkage rotatable with respect to at least one of the first linkage and second linkage; and
a fourth linkage connected between the first linkage and second linkage, the fourth linkage rotatable with respect to at least one of the first linkage and second linkage.

\* \* \* \* \*